United States Patent [19]
Welch

[11] Patent Number: 5,938,772
[45] Date of Patent: Aug. 17, 1999

[54] RESPONSIVE BACKLIT HARDWIRE BUTTON ARRAY PROVIDING ILLUMINATION AND USER FEEDBACK IN A COMPUTER

[75] Inventor: Gary C. Welch, Spring, Tex.

[73] Assignee: Compaq Computer Corporation, Houston, Tex.

[21] Appl. No.: 08/872,715

[22] Filed: Jun. 11, 1997

[51] Int. Cl.[6] .................................................. G06F 1/32
[52] U.S. Cl. ........................................ 713/320; 713/323
[58] Field of Search ...................... 395/750.03, 750.05, 395/280, 284; 349/61; 713/300, 320, 323; 710/100, 104

[56] References Cited

U.S. PATENT DOCUMENTS

| | | | |
|---|---|---|---|
| 3,811,025 | 5/1974 | Bach | 200/317 |
| 5,034,809 | 7/1991 | Katoh | 358/88 |
| 5,072,411 | 12/1991 | Yamaki | 345/520 |
| 5,363,223 | 11/1994 | Beesley | 349/72 |
| 5,448,675 | 9/1995 | Leone et al. | 385/135 |
| 5,549,984 | 8/1996 | Dougherty | 429/61 |
| 5,630,142 | 5/1997 | Crump et al. | 395/750.05 |
| 5,664,119 | 9/1997 | Jeffries et al. | 395/283 |
| 5,718,326 | 2/1998 | Larose et al. | 200/314 |

*Primary Examiner*—Gopal C. Ray
*Attorney, Agent, or Firm*—Conley, Rose & Tayon, P.C.; Michael F. Heim; Jonathan M. Harris

[57] ABSTRACT

A computer system including a small array of backlit buttons that can be used to control certain computer system functions. Each button includes a built-in backlight which preferably is a light emitting diode ("LED") that allows a user to see more easily the label on the button. Visual feedback that a button is pressed is provided to the user by turning off a button's backlight when the button is pressed. Thus, once the light in a button turns off, the user knows the button has been depressed sufficiently to activate the function associated with the button. In another aspect of the invention, the computer system may enter a low power consumption sleep mode in which most of the computer's functions are disabled. In the sleep mode the backlights in the button array are turned off to further save power. The computer system also includes a telephone answering machine ("TAM") capability which includes a backlit button that allows the user to play back a previously recorded telephone message. Additionally, the backlight in the TAM button repetitively blinks on and off to indicate the presence of a recorded telephone message. The TAM button's backlight will blink even when the computer is in the sleep mode.

21 Claims, 3 Drawing Sheets

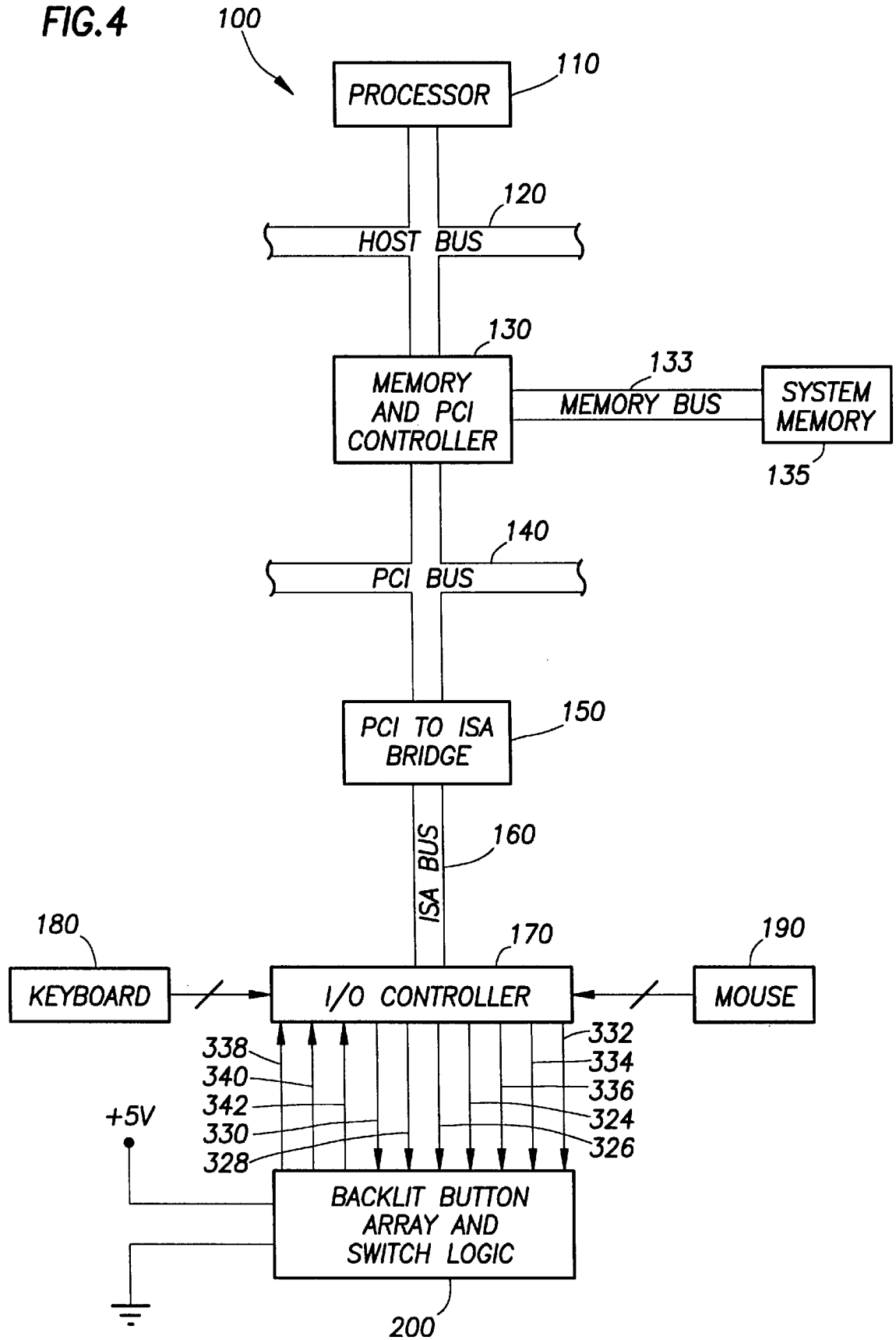

RESPONSIVE BACKLIT HARDWIRE BUTTON ARRAY PROVIDING ILLUMINATION AND USER FEEDBACK IN A COMPUTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to personal computer (PC) systems. More particularly, the present invention relates to an improved user interface for a personal computer that simulates the input/output interface used in other consumer electronics, such as compact disk (CD) players. Still more particularly, the present invention relates to a user interface that provides visual feedback to the user.

2. Background of the Invention

Computers have undergone a dramatic evolution since their introduction in the late 1970's and early 1980's. Early computer systems were difficult to use and understand. Typically, data was input to the computer by typing specific memorized commands into a keyboard. A one-task operating system such as MS-DOS (Microsoft Disk Operating System) was loaded on the computer and functioned to interpret and execute the commands.

Many improvements have been developed for computer systems since the introduction of the first systems. One of the areas that has experienced dramatic improvement is the user interface to the computer system. For example, modern system keyboards have greater input capabilities than the keyboards used with the first computer systems. The early keyboards typically had 83 input keys. To give the user additional options, keyboards with added keys (such as the CONTROL and FUNCTION keys) were introduced. However, the addition of keys to the original keyboard design had certain drawbacks. For example, a greater number of keys led to additional complexity and hence, confusion for the user. This confusion was compounded by a lack of continuity among applications for special keys or combinations of keys. For example, a key or a combination of keys that has one function with one application very likely has a different function when another application is running. Thus, although the addition of keys to the keyboard resulted in a more powerful keyboard, the trade-off was that the keyboard was more difficult to use.

For many computer users, memorizing and typing in commands to the computer via the keyboard is awkward and complicated. Because of this, alternate data input devices to the keyboard have been developed. One of the most popular of these alternate data input devices is a mouse. To maximize the usefulness of the mouse and to simplify entry of commands into a computer, software vendors have developed graphical user interfaces (GUI's) that implement graphics, special menu technology, and the mouse. One of these graphical user interfaces has been referred to as "WIMP" (which stands for Windows, Icons, Mouse, and Pull-down) menus. The WIMP concept includes windows on the screen, icons, mouse operation, and pull-down menus containing functions. By using a mouse, the user can move a pointer, a cross-hair, or an arrow across the screen. When the user presses the mouse button, she can select items from a menu, mark text in a word processing program, or paint in a drawing program. However, as computer systems, operating systems, and software applications become increasingly powerful, many more icons or pull-down options are available for selection by the user. Operating systems and software applications may require a user to navigate many "levels" of icons or pull-down windows before reaching the desired application or command. Under these circumstances, rather than simplifying the entry of commands to the computer, the graphical user interface may actually add complexity and confusion. Instead of wasting time progressing through many levels of icons or pull-up windows, many users prefer once again to memorize commands and use the admittedly complicated and awkward keyboard to select applications and commands. Thus, there is a need for some input method or device that increases "user friendliness" by reducing operator confusion when performing or executing certain system functions.

The computer industry is continually striving to provide additional computer enhancements to entice computer novices to purchase a computer system. Despite the near universal presence of the computer in the office environment, many people still are uncomfortable with computers and are reluctant to purchase or upgrade a home computer. Therefore, it is important for computer designers to add new features to new computer products, while at the same time giving the user a feeling of familiarity and comfort. Thus, the computer designer must add features (and complexity) while actually making the computer more user friendly. In addition, new computer systems preferably are compatible with current computer systems. As such, any invention that enhances ease of use by reducing operator confusion and by improving the responsiveness of the computer must also operate seamlessly with a broad range of already existing applications and systems. That is, the invention should be compatible with other computers and applications that are on the market such that an application that can operate on another computer can still operate without difficulty on a newly designed computer system.

As a further complication, all of these design criteria must be done in the framework of maintaining the affordability of the computer system. Thus, any new feature preferably is implemented using existing hardware or inexpensive components. Thus, ideally, many more functions would be provided to the user without any additional cost, while increasing user friendliness.

While it is impossible to predict the future, it is safe to assume that, based upon past history, future computer processors will become increasingly more powerful, making the computer capable of performing more functions. For example, a CD-ROM drive in a modern computer often doubles as an audio CD player. A computer may also double as a television or a telephone answering machine. Other roles for the computer will inevitably develop. However, these capabilities are undermined because the average user may be unable or unwilling to access these enhanced features. For instance, to use the CD-ROM player as an audio CD player, an operator is required to proceed with the mouse through multiple levels of icons or pull-down menus before a CD is loaded and ready to play. The user must then use the mouse to select "Play Music" from a menu or screen before music is played from the CD. As the array of options increases, users will be faced with increasingly complex graphics user interfaces unless another solution is found.

One approach to solving the problem has been suggested in copending application entitled "Computer Interface With Hardwire Button Array," Ser. No. 08/846,333, filed on Apr. 30, 1997 and assigned to Compaq Computer Corporation. That application discloses a set of button switches, referred to as a button array, mounted to the top of a mini-tower computer design. Each button in the array provides a particular control function, such as controlling the playback of CD's, answering telephone calls, and other desired system functions. To identify the functions controlled by the buttons, each button is labeled with alphanumeric characters or icons representing the function associated with the button.

Although using a button array is an effective solution to the problem, being able to see the labels on the buttons sometimes may be difficult, particularly in poor lighting conditions. The difficulty in seeing the labels is particularly problematic when the room lights are turned down or off or when there is a glare on the buttons. Often times, the computer chassis is located beneath a desk or table, where lighting conditions are poor. Without being able to clearly see the labels on the buttons, a user may have difficulty determining which button to press.

Buttons include electrical contacts that connect together when the button is pressed and disconnect when the button is released. A button, such as that used in the button array of the "Computer Interface with Hardwire Button Array", can be depressed a predetermined range of distances between a maximum distance and a minimum distance at which the electrical contacts close. If a button is depressed less than the minimum distance, the electrical contacts will not close and the system will not react. In some instances, the user may be unable to determine if the system is responding. For example, when the PLAY button is pressed to begin playing an audio CD, it may be several seconds before music is heard. In the meantime, the user does not know whether she has pressed the button sufficiently to cause the CD to be played.

Accordingly, it would be desirable to provide a button array on a computer system that is easily viewed even in poor lighting conditions. Thus, if the lights are turned down low or off or if there is a glare on the buttons, the user will still be able to see the button labels. It also would be desirable to provide feedback to the user to inform the user when the button has been depressed sufficiently for initiating the system response. Such improved button viewability and feedback would be helpful to a user when playing a CD, answering the telephone, or any other computer functions controlled by the buttons.

SUMMARY OF THE INVENTION

The present invention solves the deficiencies of the prior art by including a small array including at least one backlit button that can be used to control certain computer system functions. The buttons can be conveniently located anywhere on the computer including the chassis, the display, or any other suitable location. The buttons control the playback of CD's, answer telephone calls, and provide other desired capabilities by depressing a single button. Each button includes a switch and a built-in backlight which preferably is a light emitting diode ("LED") that allows a user to more easily see the label on the button. Visual feedback is provided to the user by turning off a button's backlight when the button's switch is pressed. Thus, once the backlight in a button turns off, the user knows the button has been depressed sufficiently to activate the function associated with the button.

In another aspect of the invention, the computer system may enter a low power consumption mode, referred to as the "sleep" mode. In the sleep mode, most of the computer's functions are disabled and the backlights in the button array are turned off to further save power and provide an indication to the user that the functions associated with the buttons, except one, are temporarily disabled. The only button function remaining active during the sleep mode is the telephone answering machine ("TAM") capability which includes a backlit button that allows the user to play back a previously recorded telephone message. Additionally, the backlight in the TAM button repetitively blinks on and off to indicate the presence of a recorded telephone message and by pressing this button, the message is played back to the user.

The computer also includes a programmable logic device ("PLD") to which the backlit buttons are coupled. The PLD is programmed to enable the computer's processor to determine when a button is pressed and which button is pressed. An input/output controller coupled to the PLD sequentially asserts one or more input strobe signals to the PLD and monitors output signals from the PLD to determine which of the buttons coupled to the PLD is pressed.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 4 is a block diagram of the computer system of FIG. 1 showing the functional components in accordance with the preferred embodiment for coupling the computer system's processor to a button array and switch logic.

DETAILED DESCRIPTION OF THE PREFERRED EMBODIMENT

Figure 1:
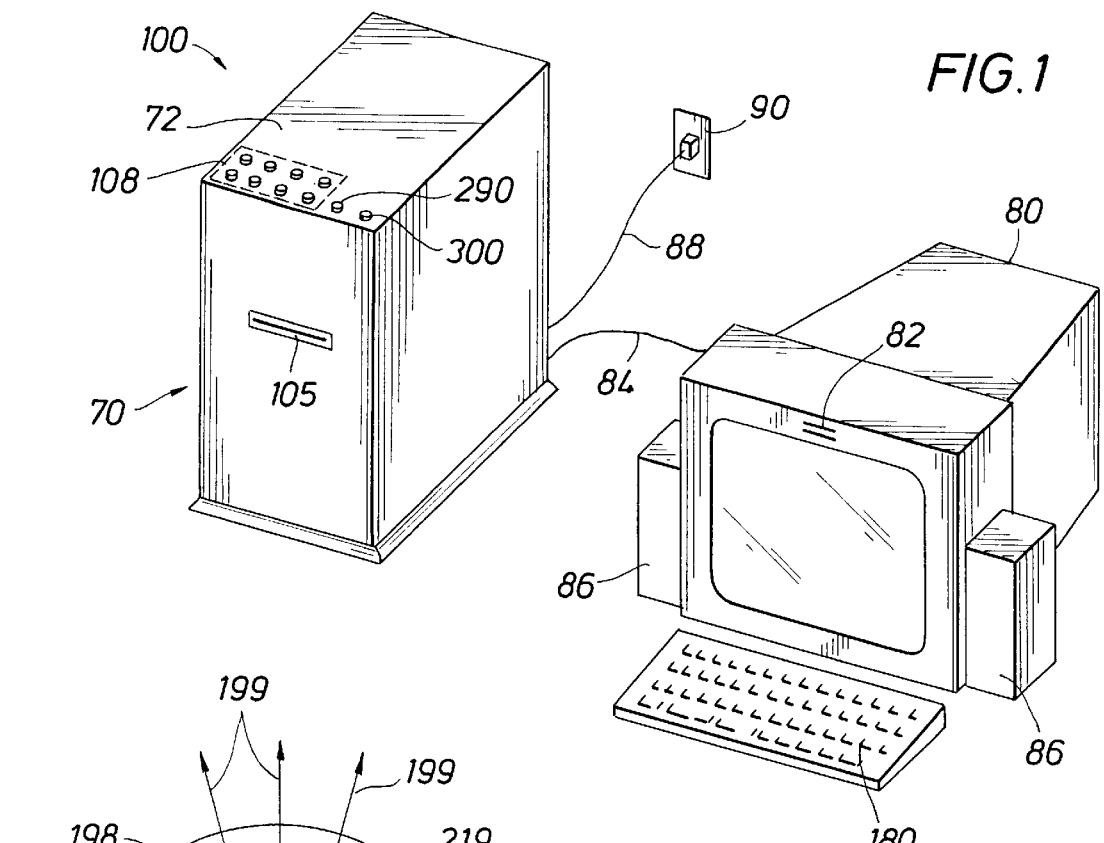
FIG. 1 shows a computer system including an array of buttons in accordance with the preferred embodiment.

Referring now to FIG. 1, a computer system 100 constructed in accordance with the preferred embodiment generally includes a housing or chassis 70, a display 80 connected to chassis 70 by cable 84 and a keyboard 180. Computer system 100 preferably accommodates different types of input/output devices for receiving user inputs and for displaying system outputs. For example, a CD ROM drive 105 enables a user to play compact disks, which can be heard by the user through speakers 86. Additionally, a user may desire for computer system 100 to be provided with telephone answering capabilities. If so, a telephone line cord 88 preferably connects a telephone jack 90 to chassis 70. When computer system 100 receives a telephone call, the call is answered (as described below) allowing the user to listen to the caller through speakers 86 and speak to the caller through a microphone 82 preferably built into the display 80.

In the preferred embodiment of the present invention, an array of bezel buttons 108 and indicators 290, 300 are located on the chassis 70 of the computer system 100. The buttons, however, can be located anywhere on the computer such as on display 80. As shown in FIG. 1, the chassis 70 may be configured as a mini-tower design with button array 108 and indicators 290, 300 located on the upper surface 72 of the chassis. Each button in the array 108 preferably is associated with various functions of the computer. Although more than one button is shown in array 108, the array may include only one button, if desired. Indicator 290 indicates when the computer system is in a "sleep" mode (described in more detail below) and also indicates whether the computer system is powered on.

Figure 2:
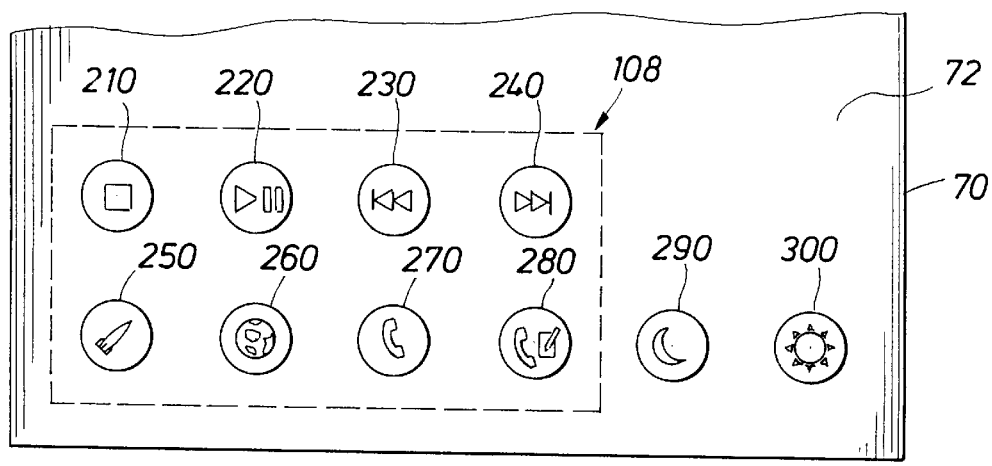
FIG. 2 shows the button array of FIG. 1 in greater detail.

Referring now to FIG. 2, the button array 108 and indicators 290, 300 are shown in more detail. In accordance with the preferred embodiment, button array 108 preferably includes eight buttons 210, 220, 230, 240, 250, 260, 270, 280, although the number of buttons is not critical to the invention. Also shown in FIG. 2 are the two visual indicators 290, 300, which indicate when the computer is in the "sleep" mode (indicator 290) and when the computer is powered on (indicator 300). Circuitry for sensing when a button has been pressed and the manner in which indicators 290 and 300 are activated is discussed below with reference to FIG. 4.

Each button in the array 108 preferably controls an associated system function. The particular function controlled by each button preferably is identified by a label or icon placed on each button in the array 108. The labels preferably use standard symbols such as those shown in FIG. 2 for identifying the functions controlled by the buttons. Buttons 210, 220, 230, 240, for example, may be used to control the CD drive 105 shown in FIG. 1 for playing audio signals (i.e., music) through speakers 86. The functions commonly required to control a CD drive are STOP, PLAY, PREVIOUS TRACK, and NEXT TRACK and are controlled by buttons 210, 220, 230, and 240, respectively.

Button 250 preferably comprises a user-defined button and computer system 100 enables the user to program this button for any desired function in accordance with standard programming techniques. Button 260 preferably provides the user with instant Internet access. When button 260 is pressed, computer system 100 automatically loads appropriate software for dialing into the Internet and initiates Internet access. Button 270 preferably comprises a speaker phone button enabling the user to make a telephone call. Finally, button 280 preferably comprises a telephone answering machine (TAM) button and lets the user listen to previously recorded telephone messages.

Figure 3:
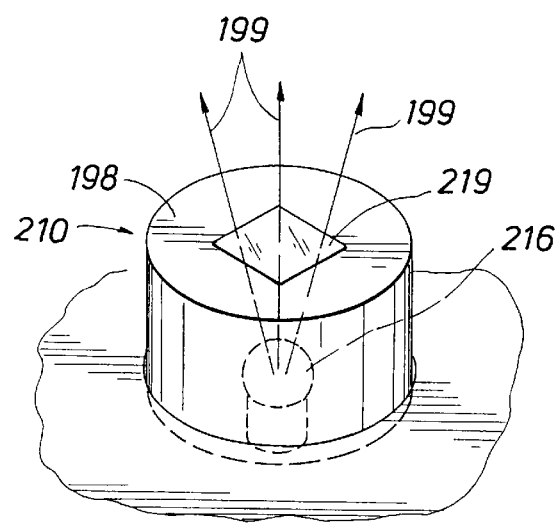
FIG. 3 shows an exemplary button of the button array of FIGS. 1 and 2 with a backlight in accordance with the preferred embodiment.

Buttons 210–280 preferably include a light source built into the buttons to provide backlighting making the labels on the buttons easier to view. The use of backlighting makes it easier to see the buttons in poor lighting conditions, or when a glare is present. In some instances, it may be preferable to place the labels adjacent the button instead of on the button. For example, placement of the labels over the button is advantageous to allow the operator to see the label even when pressing the button. In this case, and in accordance with the preferred embodiment, buttons 210–280 are still backlit to enable the user to see the buttons in reduced lighting. Referring now to FIG. 3, a backlit button 210 preferably includes a label or icon 219 (a square shape representing the stop play function for CD drive 105) and a backlight 216 emitting light in the direction of arrows 199. By shining light from within the button through the top surface 198 of the button 210, the button 210 and label 219 are easily seen by a user. It should be recognized that surface 198 is sufficiently transparent to allow light through. Alternatively, surface 198 may be opaque allowing light through only through label 219.

Referring now to FIG. 4, computer system 100 preferably includes a processor 110 coupled to a memory and peripheral component interconnect ("PCI") controller 130 over a host bus 120. Memory and PCI controller 130 couples to a PCI-to-ISA bridge 150 via a PCI bus 140. System memory 135, preferably comprising dynamic random access memory ("DRAM") circuits, couples to memory and PCI controller 130 via a memory bus 133. The memory and PCI controller 130 preferably includes a memory controller for orchestrating data transfers with the system memory 135 via memory bus 133. An input/output ("I/O") controller 170 preferably couples to a PCI to ISA bridge 150 over an ISA bus 160. In the preferred embodiment, and according to normal convention, computer system 100 includes one or more input/output devices such as a keyboard 180 and mouse 190. Backlit button array and switch logic 200 also couples to I/O controller 170 through input signal lines 324, 326, 330, 332, 334, 336 and output signal lines 338, 340, 342. Backlit button array and switch logic 200 is shown in greater detail in FIG. 5.

The processor 110 may comprise any suitable processor, including the Pentium® processor, Pentium II® processor, K-6®, or any other processor capable of operating a computer system in a fashion consistent with the preferred embodiment. The host bus 120 and memory bus 133 preferably include data, address, and control lines to transfer data and addresses between components connected to the host bus. Similarly, PCI bus 140 and ISA bus 160 also include data, address, and control lines in accordance with the PCI and ISA standards, respectively.

The I/O controller 170 may include any common input/output controller device or any custom designed device in accordance with known techniques. In accordance with the preferred embodiment, I/O controller 170 includes an application specific integrated circuit ("ASIC") manufactured by Standard Microsystems Corporation. The I/O controller 170 enables keyboard 180, mouse 190 and backlit button array and switch logic 200 to communicate with processor 110 by way of PCI to ISA bridge 150 and memory and PCI controller 130.

Referring now to FIGS. 2 and 4, buttons 210–280 include backlighting for enhanced viewability by a user. Button array and switch logic 200 also provides the user with visual feedback when a button is pressed, thereby letting the user know the button has been sufficiently pressed to initiate the system function associated with the button. In accordance with the preferred embodiment, the visual feedback is in the form of turning off a button's backlighting feature when the button is depressed by the user. The deactivation of the backlight notifies the user that the button has been sufficiently pressed to initiate whatever function is controlled by that button.

Figure 5:
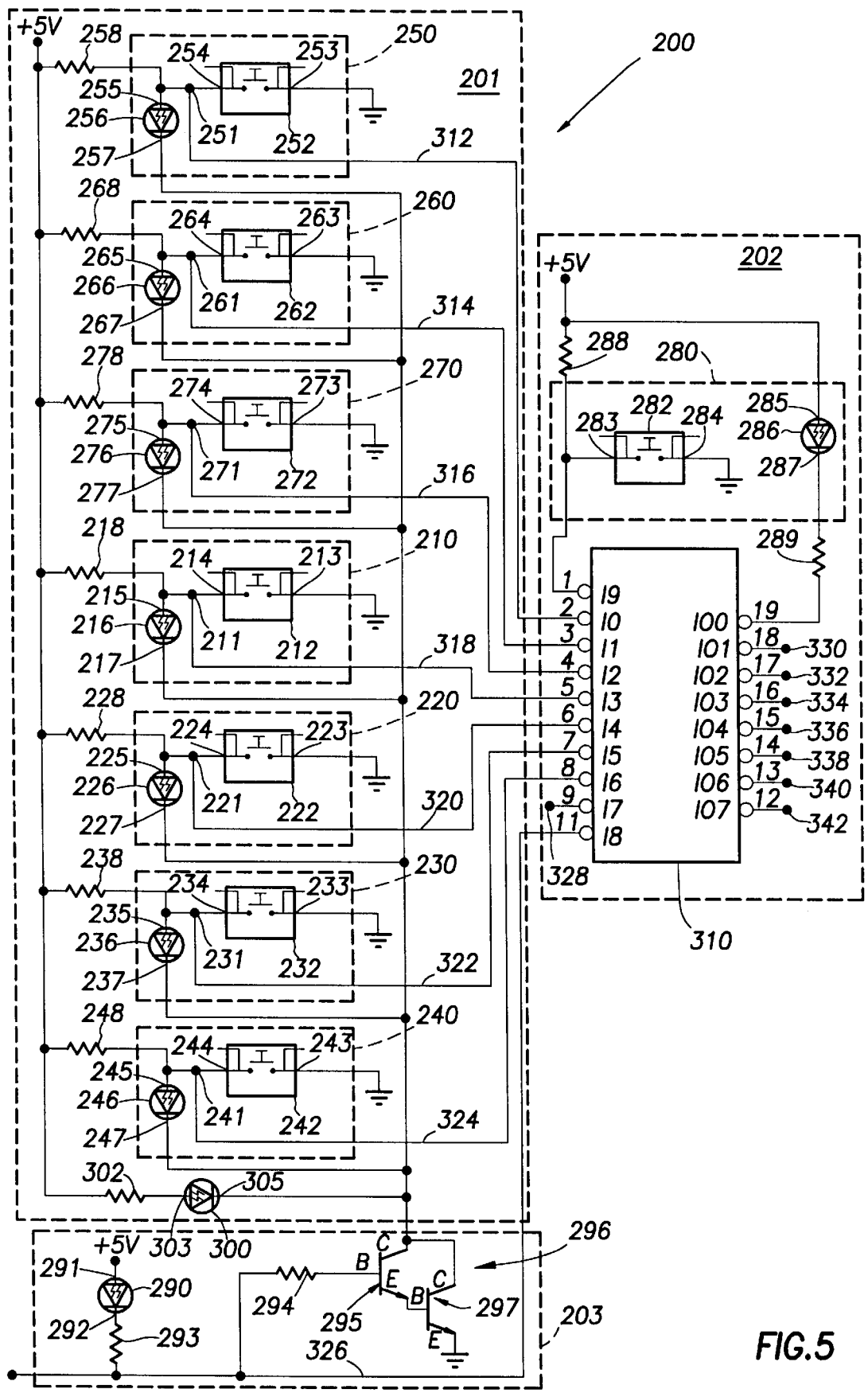
FIG. 5 is a more detailed schematic of the button array and switch logic of FIG. 4.

Referring now to FIG. 5, backlit button array and switch logic 200 preferably includes button switch network 201, switch logic 202, and sleep circuit 203. Button switch network 201 includes backlit buttons 210, 220, 230, 240, 250, 260, 270, resistors 218, 228, 238, 248, 258, 268, 278, 302, and power indicator 300. Each backlit button comprises a switch and an indicator or backlight. Thus, button 210 includes switch 212 and indicator 216. Similarly, buttons 220–270 include switches 222–272 and indicators 226–276, respectively. Indicators 216–276 and power indicator 300 preferably comprise light emitting diodes ("LED's"). Preferred component values and part numbers for the components of backlight button array and switch logic 200 are identified below in Table I, with the understanding that other components and component values may be used if desired without departing from the principles of the present invention.

Table I below indicates preferred components for the circuitry shown in FIG. 4.

TABLE I

| Component | Manufacturer/part number | Component Value |
|---|---|---|
| Switches 212–276, 282 | ITT Cannon/KSA1A211 | n/a |
| LED's 217–286, 290, 300 | ITT Stanley/MMA5364 | N/a |
| Resistors 218–278, 289 | Rohm | 100 ohms |
| Resistors 302, 293 | Rohm | 150 ohms |
| Resistors 294, 288 | Rohm | 2.2 k ohms |
| Transistors 295, 297 | Rohm | 2N2222A |
| PLD 310 | Lattice Semiconductor/16V8 | N/a |

It should be recognized that, although the part number shown in Table II is for an orange-colored LED, different color LED's can be used. For example, a green LED preferably is used for POWER LED 300.

In the preferred embodiment, each button 210–270 is configured identically. The STOP switch 212, like switches 222–272, preferably comprises a normally open switch, and includes contacts 213 and 214. Thus, contacts 213 and 214 are electrically connected only when switch 212 is pressed; otherwise, contacts 213 and 214 are not connected. Contact 213 connects to ground and contact 214 connects to resistor 218 and the anode 215 of LED 216 at junction 211. The terminal of resistor 218 not connected to switch contact 214 couples to the positive power supply voltage, which preferably is 5 volts. The cathode of LED 216 connects to a Darlington transistor pair 296 of sleep circuit 203, which is described in detail below.

A stop switch (stop_sw) signal is provided on line 318 from junction 211 to switch logic 202. When switch 212 is not pressed, contacts 213 and 214 are not connected and the stop_sw signal is a logic high value as junction 211 is pulled high through resistor 218. When switch 212 is pressed, however, contact 214, and thus junction 211, is pulled low through contact 213 to ground. Therefore, normally the stop_sw signal is high, but becomes a low value during the time switch 212 is pressed. As will be described in greater detail below, switch logic 202 detects when the stop_sw signal is pulled low, thereby determining when the stop button 210 has been pressed.

Referring still to FIG. 5, button 220 is the PLAY/PAUSE button and initiates the playing of a compact disk when pressed. If pressed again while a compact disk is playing, playing of the disk is suspended (i.e., paused) until button 220 is pressed again. Switch 222 includes contact 223 connected to ground and contact 224 connected to junction 221 which is the junction between resistor 228 and the anode 225 of the PLAY LED 226. A play_sw signal on line 320 from junction 221 is provided to switch logic 202 is monitored as an indication of when the play button 220 is pressed.

Button 230 is the PREVIOUS TRACK button and when pressed causes the CD drive 105 to jump to the previous track on the compact disk being played. Switch 232 includes contact 233 connected to ground and contact 234 connected to junction 231 which is the junction between resistor 238 and the anode 235 of the PREVIOUS TRACK LED 236. A pr_track_sw signal on line 322 from junction 231 is provided to switch logic 202 and is monitored as an indication of when the PREVIOUS TRACK button 230 is pressed.

Button 240 is the NEXT TRACK button and when pressed causes the CD drive 105 to skip to the next track on the compact disk being played. Switch 242 includes contact 243 connected to ground and contact 244 connected to junction 241 which is the junction between resistor 248 and the anode 245 of the NEXT TRACK LED 246. A nx_track_sw signal on line 324 from junction 241 is provided to switch logic 202 and is monitored as an indication of when the NEXT TRACK button 240 is pressed.

Button 250 is a user definable button and when pressed directs processor 110 to perform whatever function the user has previously programmed for that button. Switch 252 includes contact 253 connected to ground and contact 254 connected to junction 251 which is the junction between resistor 258 and the anode 255 of the USER LED 256. A user_sw signal on line 312 from junction 251 is provided to switch logic 202 and indicates when the USER button 250 has been pressed.

Button 260 is an INTERNET button and when pressed directs processor 110 to initiate access to the Internet using appropriate communication and internet access software. Switch 262 includes contact 263 connected to ground and contact 264 connected to junction 261 which is the junction between resistor 268 and the anode 265 of the INTERNET LED 236. A internet_sw signal on line 314 from junction 261 is provided to switch logic 202 and indicates when the INTERNET button 260 is pressed.

Finally, button 270 is the SPEAKER PHONE button and when pressed indicates that the user wishes to place an outgoing telephone or answer an incoming call. Switch 272 includes contact 273 connected to ground and contact 274 connected to junction 271 which is the junction between resistor 278 and the anode 275 of the SPEAKER PHONE LED 276. A sp_phone_sw signal on line 316 from junction 271 is provided to switch logic 202 and indicates when the SPEAKER PHONE button 270 is pressed.

Power indicator 300 also includes an LED and its anode 303 connects through resistor 302 to the 5 volt power supply. The cathodes of LED's 216–276 and 300 (i.e., cathodes 217, 227, 237, 247, 257, 267, 277, 305) all connect to Darlington transistor pair 296 in sleep circuit 203.

Referring still to FIG. 5, backlit button array and switch logic 200 includes sleep circuit 203 which turns off backlight LED's 216–276 and power LED 300 when computer system 100 is in the sleep mode. During periods of time in which the user has not pressed a key on the computer's keyboard 180 or a button on button array 108, computer system automatically enters a sleep mode. While in the sleep mode, all but the most essential computer functions are disabled to save power. Thus, the display 80 (FIG. 1) is turned off and all other visual indicators including backlight LED's 216–276 and power LED 300 are turned off so that computer system 100 minimizes its power consumption. Additionally, the processor 110 enters a low power consumption mode and all program execution is temporarily suspended. During the sleep mode, only mandatory functions remain active such as periodically refreshing system memory 135 to retain the data already stored in the memory.

Sleep circuit 203 includes a SLEEP LED 290 which illuminates to indicate when the computer system is currently in the sleep mode, resistors 293, 294, and a transistor pair 295, 297. The anode 291 of LED 290 connects to the 5 volt power supply and the cathode 292 connects through serially-connected resistors 293, 294 to the base B of transistor 295. A sleep signal is provided on line 326 to the junction between resistors 293 and 294. Transistors 295, 297 preferably are configured in a commonly known Darlington configuration to provide sufficient drive current to simultaneously turn on all backlight LED's 216–276 and power indicator 300. Alternatively, it may be sufficient to provide only one transistor or be necessary to use more than two transistors depending on the number of LED's that need be driven. Both collectors C of transistors 295, 297 connect to the cathodes 217–277, 305 of LED's 216–276, 300. The emitter E of transistor 295 connects to the base B of transistor 297 and the emitter E of transistor 297 connects to ground.

Referring now to FIGS. 4 and 5, when computer system 100 is in its normal active mode (i.e., not in sleep mode), the output of the I/O controller 170 that provides the sleep signal on line 326 is driven to a high impedance state. In this mode, enough current is driven by the 5 volt power supply through LED 290 and resistors 293, 294 into the base of transistor 295 to turn on transistors 295, 297. The resistance values for resistors 293, 294 are selected so that they allow enough current to turn on the Darlington transistor pair 296, but insufficient current for LED 290 to be bright enough to be seen. Thus, although illuminated, LED 290 will be sufficiently dim that it will appear to be off indicating the computer system is not in the sleep mode.

With Darlington transistor pair 296 turned on and switches 212–272 open (i.e., not pressed), current is provided through resistors 218–278, LED's 216–276, and transistors 295, 297 to ground, thereby illuminating backlight LED's 216–276. Additionally, current also flows through resistor 302 and the power LED 300, turning on LED 300 indicating that power is on to computer system 100.

When the computer system 100 enters the sleep mode, the sleep signal on line 326 is asserted low by I/O controller 170 turning on sleep LED 290 to indicate that the computer is in the sleep mode. With the sleep signal asserted low, the junction between resistors 293 and 294 is likewise brought low. Accordingly, insufficient current flows into the base B of transistor 295 and thus both transistors 295, 297 in Darlington pair 296 are turned off. With transistors 295, 297 off, no current can flow through LED's 216–276 and 300 and thus, those LED's will be not be illuminated. Once the user presses the power button (not shown), the computer system 100 responds by entering the active mode of operation, I/O controller 170 drives its sleep signal output to a high impedance state, and backlight LED's 216–276 and power indicator 300 will once again turn on.

In addition to backlighting buttons 210–270, LED's 216–276 also are used to provide visual feedback to the user when a button is pressed. In accordance with the preferred embodiment, a backlight LED turns off when its associated switch is pressed to provide visual feedback to the user. Accordingly, when any of the switches 212–272 is pressed the anode of the LED connects to ground, thereby turning off the LED. When the switch is released, the anode becomes ungrounded. Because the cathodes of the backlight LED's are all substantially grounded through Darlington transistor pair 296, the backlight LED turns off. Thus, normally each of the LED's is on, but turns off during the time its associated switched is pressed. By turning off the backlight when a button is pressed, the user is provided with visual feedback that the button was pressed sufficiently to initiate the function associated with that button.

Referring still to FIG. 5, switch logic 202 preferably includes a programmable logic device ("PLD") 310, resistors 288, 289, and TAM button 280. The PLD 310 may include any commonly known programmable device. In accordance with the preferred embodiment, PLD 310 is a 20 pin device with a maximum of 16 input pins and a maximum of 8 output pins. Some of the pins can be programmed either as inputs or outputs. Table II below includes the input and output signals for PLD 310. As described in the Table, all of the input and output signals are inverted by the PLD. The I0–I9 and IO1–IO7 signals are signals internal to the PLD and represent the input and output signals on pins 1–9, 11–19 logically inverted. For example, signal I0 associated with pin 2 is the inverted form of the user_sw signal on line 312. The "/" in Table II indicates the logical NOT operator.

TABLE II

Input/Output Signals For PLD 310.

| Input/output signal | PLD pin | Input or output? | PLD internal signal |
|---|---|---|---|
| tam_sw | 1 | Input | I9 = /tam_sw |
| user_sw | 2 | Input | I0 = /user_sw |
| internet_sw | 3 | Input | I1 = /internet_sw |
| sp_phone_sw | 4 | Input | I2 = /sp_phone_sw |
| stop_sw | 5 | Input | I3 = /stop_sw |
| play_sw | 6 | Input | I4 = /play_sw |
| pr_track_sw | 7 | Input | I5 = /pr_track_sw |
| nx_track_sw | 8 | Input | I6 = /nx_track_sw |
| tam | 9 | Input | I7 = /tam |
| sleep | 11 | Input | I8 = /sleep |
| B6 | 12 | Output | IO7 = /B6 |
| B5 | 13 | Output | IO6 = /B5 |
| B4 | 14 | Output | IO5 = /B4 |
| B3 | 15 | Input | IO4 = /B3 |
| B2 | 16 | Input | IO3 = /B2 |
| B1 | 17 | Input | IO2 = /B1 |
| B0 | 18 | Input | IO1 = /B0 |
| tam_led | 19 | Output | IO0 = /tam_led |

The B0–B3 signals on lines 330–336 are asserted by the I/O controller 170 and are referred to as strobe signals. By asserting the strobe signals and monitoring the output B4–B6 signals on lines 338–342, the I/O controller 170 and processor 110 can determine which switch is being pressed. The switch signals on lines 312–324 are provided from switch network 201 and are described above. The tam, sleep, and B0–B6 signals are provided to or from I/O controller 170. The TAM button 280 includes TAM switch 282 and TAM backlight 286 which preferably is an LED. Switch 282 includes contacts 283 and 284 with contact 284 connected to ground. Contact 283 connects to one terminal of resistor 288 and also provides a tam_sw signal to pin 1 of PLD 310. The other terminal of resistor 288, as well as the anode 285 of TAM LED 286, connects to the 5 volt power supply. The cathode 287 of LED 286 connects through resistor 289 to pin 19 of PLD 310. The PLD 310 can thus turn LED 286 on by asserting the tam_led signal on pin 19 to a logic 0 state.

In accordance with the preferred embodiment, the PLD 310 implements a switch matrix for sensing when a switch has been pressed and determining which switch was pressed. The relationships between the input switch signals on pins 1–8, 15–18 (I0–I6, I9, IO4–IO7) and the output signals (IO5–IO7) on pins 14–12 are shown below in Boolean logic equations (1), (2), and (3). The signals used in equations (1)–(3) can be matched with the PLD input and output signals by way of Table I above.

$$IO5 = IO1*I0 + IO3*I2 + IO4*I9 \tag{1}$$

$$IO6 = IO1*I3 + IO2*I4 + IO3*I5 + IO4*I6 \tag{2}$$

$$IO7 = IO2*I1 \tag{3}$$

where "*" indicates the logical AND operation and "+" indicates the logical OR operation.

Equation (1) is used to determine when the USER button 250, SPEAKER PHONE button 270, and TAM button 280 is pressed. In a similar manner, equation (2) is used to determine when the STOP button 210, PLAY button 220, PREVIOUS TRACK 230, and NEXT TRACK button 240 are pressed. Finally, equation (3) is used to determine when the INTERNET button 260 is pressed. Equations (1) and (2) are similar in terms of determining when the buttons associated with each equation are pressed. Thus, only the use of equation (1) will be illustrated, with the understanding that equation (2) is used in a similar fashion. Specifically, equation (1) will be explained for determining when the SPEAKER PHONE button 270 is pressed.

Referring now to FIG. 5 and Table III below, PLD input signals IO1, IO3, IO4 are initially asserted high. As discussed previously, switches 212–272 are normally open and thus all of the switch signals on lines 312–324 are normally logic high values. The logic high signals from the USER, SPEAKER PHONE and TAM switches are represented in the second row of Table III. Accordingly, output signal IO5 is initially at a logic 0 state.

TABLE III

Detecting that SPEAKER PHONE switch is pressed using equation (1)

| 1 | | IO1 * IO | + | IO3 * I2 | + | IO4 * I9 | = | IO5 |
|---|---|---|---|---|---|---|---|---|
| 2 | Initially | 1 * 0 | + | 1 * 0 | + | 1 * 0 | = | 0 |
| 3 | button 272 pressed | 1 * 0 | + | 1 * 1 | + | 1 * 0 | = | 1 |
| 4 | button 272 pressed | 0 * 0 | + | 0 * 1 | + | 0 * 0 | = | 0 |
| 5 | button 272 pressed | 1 * 0 | + | 0 * 1 | + | 0 * 0 | = | 0 |
| 6 | button 272 pressed | 0 * 0 | + | 1 * 1 | + | 0 * 0 | = | 1 |
| 7 | button 272 pressed | 0 * 0 | + | 0 * 1 | + | 1 * 0 | = | 0 |

When the SPEAKER PHONE button 272 is pressed, the sp_phone_sw signal becomes a logic 0 value as indicated by the logic 1 value for I2 in the third row of Table III. This change in the I9 signal from logic 0 to 1 forces signal IO5 to a logic 1 state indicating to processor 110 that a switch has been pressed. At this point processor 110 does not know which switch has been pressed, only that either the USER, SPEAKER PHONE, or TAM buttons is pressed. Processor 110 determines which switch is pressed in a series of steps shown in rows 4–7 rows of Table III. The series of steps indicated in rows 4–7 occur fast enough that they occur before the user releases the button.

In the fourth row of Table III, processor 110 asserts signal IO1, IO3, IO4 to logic low states causing IO5 to become a logic 0 value. Beginning in the fifth row of Table III, processor 110 (through I/O controller 170) sequentially asserts one of the signals IO1, IO3, IO4 to a logic high state keeping the other two input signals at logic low states. Each time one IO1, IO3, IO4 is asserted high, processor 110 monitors the output signal IO5 for a change in its state from logic 0. A change in state of IO5 will only occur when both an IO1, IO3, IO4 signal and its associated I0, I2, I9 switch signal in equation (2) are logic 1 values. In the fifth row, processor 110 first asserts IO1 to a logic high value keeping IO3 and IO4 at logic low values. The IO5 signal remains at a logic 0 value indicating to the processor that the USER switch 250, which drives the I0 signal, is not pressed. In the sixth row, signal IO3 is asserted high and IO5 changes state to a logic 1 value because I2 is also high. Signal I2 is driven by the SPEAKER PHONE button 270 and thus the processor 110 knows that the user is currently pressing the SPEAKER PHONE button. The processor need not continue with row 7 because a change in state of IO4 has already been detected and the switch being pressed is known. Row 7 is merely included to show what would happen if a change in IO5 state was not observed in row 6 (which would be the case if the TAM button 280 was being pressed).

In a similar manner, processor 110 can determine when the USER button 250 and the TAM button 280 are pressed by the user. By way of equation (2), processor 110 also can determine when the STOP button 210, PLAY button 220, PREVIOUS TRACK button 230, and NEXT TRACK button 240 are pressed. It should be recognized from equation (3) that the IO7 signal will be asserted high when the INTERNET button 260 is pressed and signal IO2 is in its normally high state. Thus, processor 110 need not determine when the INTERNET button is pressed using the sequential approach described above. Processor 110 need only monitor the state of signal IO7 by monitoring signal B6.

The TAM switch 282 provided control over the computer system's telephone message retrieval feature. This feature allows the user to replay previously recorded telephone messages. TAM LED 286 indicates the presence of a recorded message which can be replayed by pressing switch 282. The TAM LED 286 is turned on and off by PLD 310 via the tam_led output signal from pin 19, rather than being turned on and off by Darlington transistor pair 296 as for LED's 216–276. Controlling TAM LED from PLD 310 is necessary as it is preferred that the TAM LED still be used even in the sleep mode to indicate the presence of a recorded telephone.

The TAM LED 286 normally is turned off by PLD 310 and preferably blinks when computer system 100 has recorded a previously received telephone call. The tam_sw signal is provided from TAM switch contact 283 to pin 1 of PLD 310. When the TAM switch 282 is pressed, the tam_sw signal becomes a logic 0 value as contact 283 connects to ground by way of contact 284. In response, the PLD 310 causes the TAM LED 286 to turn off providing the visual feedback that the button was sufficiently pressed to initiate answering playing back a recorded message. Using logic equation (4) below, PLD 310 causes TAM LED 286 to blink.

$$tam\_led = /sleep * tam * tam\_sw + sleep * /tam \qquad (4)$$

where the "/" symbol indicates the logic NOT operator. The tam_led output signal from equation (4) turns TAM LED 286 on when tam_led is a logic 0 value and off when tam_led is a logic 1 value.

As indicated by equation (4), the tam_led signal is a function of the sleep, tam, and tam_sw signals. The sleep signal is provided to pin 11 of the PLD 310 via line 326 and is a logic low value when computer system 100 is in the sleep mode. When not in the sleep mode, the I/O controller 170 asserts its sleep signal output to a high impedance state. Internal pull up resistors (not shown) in PLD 310 forces the signal on pin to a logic 1 value. The tam signal is provided to pin 9 of the PLD 310 via line 328 from I/O controller 170 (under processor control) and is normally a logic high value. When a telephone call has been received and recorded, the tam signal is repeatedly toggled between the logic 0 and logic 1 states. The rate at which the tam signal changes logic states is thus controlled by the processor 110 through I/O controller 170 and preferably is between one and three cycles per second.

The first term of equation (4) causes the TAM LED 286 to remain on to provide backlighting to TAM button 280 when the computer is not in the sleep mode. This term will also cause the TAM LED 286 to turn off when the TAM switch 282 is pressed, thereby providing visual feedback that switch 282 was in fact pressed. Additionally, the first term of equation (4) causes the TAM LED to blink when the computer is not in the sleep mode, the tam signal is toggling between logic states, and the TAM button 280 is not pressed. The second term of equation (4) causes the TAM LED to remain off when the computer is in the sleep mode, but blink when the tam signal is toggling between states indicating the presence of a previously recorded message. It should be noted that the tam_sw signal is not included in the second term of equation (4). Thus, when the TAM LED is blinking while in the sleep mode, pressing TAM switch 282 will not cause the TAM LED to turn off and thus no visual feedback is provided to the user that the TAM button is pressed. This lack of feedback is preferred as the computer system 100 is not able to respond to the tam_sw signal from the TAM button 280 while in the sleep mode.

A possible error condition occurs when two or more buttons are pressed simultaneously. In this case, processor 110 can be programmed to respond in any of a number of desired ways. For example, processor can be programmed to ignore buttons pressed simultaneously or alternatively, perform the function associated with the button that the processor determines was actually pressed first and then perform the function associated with the other button that was concurrently pressed.

Numerous variations and modifications will become apparent to those skilled in the art once the above disclosure is fully appreciated. It is intended that the following claims be interpreted to embrace all such variations and modifications.

What is claimed is:

1. A computer system comprising:
    a chassis;
    a processor;
    a display device;
    a data entry device;
    an input/output controller coupled to said processor; and
    at least one backlit button coupled to said input/output controller, said button controlling various functions of said computer system, and wherein said button includes a switch and a backlight that turns off when said button is pressed.

2. A computer system comprising:
    a chassis;
    a processor;
    a display device;
    a data entry device;
    an input/output controller coupled to said processor;
    at least one backlit button coupled to said input/output controller, said button controlling various functions of said computer system, and wherein said button includes a switch and a backlight that turns off when said button is pressed; and
    at least one transistor coupled to said button that turns on to illuminate said backlight and turns off to turn off said backlight.

3. The computer system of claim 2 wherein said input/output controller provides a sleep signal when said computer system enters a low power consumption mode, and said sleep signal causes said transistor to turn off.

4. The computer system of claim 3 wherein said at least one transistor includes a pair of transistors, and wherein said computer system includes a sleep indicator coupled to a positive power supply voltage, said positive power supply voltage providing electrical current through said sleep indicator to turn on said pair of transistors when said sleep signal is not asserted by said input/output controller.

5. The computer system of claim 4, wherein said pair of transistors comprises a Darlington configuration.

6. The computer system of claim 2, wherein said switch includes a first contact and a second contact, and said first contact connects to ground and said second contact connects to said backlight.

7. The computer system of claim 6 wherein said backlight comprises an LED, and said LED includes an anode and a cathode, with said second contacts connected to said anodes and said cathodes connected to said transistor.

8. A computer system, comprising:
    a chassis;
    a processor;
    a display device;
    a data entry device;
    an input/output controller coupled to said processor;
    at least one backlit button coupled to said input/output controller, said button including a switch and a backlight that turns off when said button is pressed; and
    a programmable logic device coupled to said input/output controller and said switch.

9. A computer system, comprising:
    a chassis;
    a processor;
    a display device;
    a data entry device;
    an input/output controller coupled to said processor;
    at least one backlit button coupled to said input/output controller, said button including a switch and a backlight that turns off when said button is pressed;
    a programmable logic device coupled to said input/output controller and said switch; and
    wherein said backlit button comprises a telephone answering machine button and said input/output controller causes the backlight in said telephone answering machine button to blink on and off when said computer system records a telephone message.

10. The computer system of claim 9 wherein said input/output controller causes the backlight in said telephone answering machine button to blink on and off when said computer system is in a low power consumption mode.

11. The computer system of claim 9 wherein said input/output controller causes said backlight to remain off while said telephone answering machine button is pressed.

12. The computer system of claim 9 wherein said programmable logic device is programmed to implement a switch matrix configuration for determining that a switch is pressed.

13. The computer system of claim 12 wherein said input/output controller provides a plurality of strobe signals to said programmable logic device, and said strobe signals are normally asserted low by said input/output controller.

14. The computer system of claim 13 wherein said input/output controller asserts said strobe signals high when an output signal from said programmable logic device changes logic states.

15. The computer system of claim 14 wherein said input/output controller sequentially asserts each strobe signal low and monitors said output signal for a change in logic state.

16. Method for determining which one of a plurality of switches is pressed and controlling various computer functions, said switches provided in a computer system and coupled to a programmable logic device, comprising:

(a) changing the logic state of an output signal from said programmable logic device when a switch is pressed;

(b) monitoring the output signal from said programmable logic device for a change in logic state;

(c) asserting a plurality of strobe signals to said programmable logic device to a logic high state when a change in logic state of said output signal is detected;

(d) sequentially asserting each of said strobe signals to a logic low state;

(e) each time a strobe signal is asserted low in step (d), monitoring said output signal for another change in logic state; and (f) repeatedly changing the logic state of a signal to a telephone answering machine indicator to make said indicator blink on and off when a telephone message has been recorded.

17. The method of claim 16 further including the step of turning off said telephone answering machine indicator when a telephone answering machine button is pressed.

18. The method of claim 16 wherein said step of repeatedly changing the logic state of a signal to the telephone answering machine indicator includes changing the state of said signal when said computer system is in a low power consumption mode.

19. The method of claim 16 wherein a switch signal is provided from each of said plurality of switches and said method includes logically ANDing each of said switch signals with a strobe signal.

20. A computer system capable of operating in low power mode, comprising:

a chassis;

a processor housed in said chassis;

a display device coupled to said processor;

a data entry device coupled to said processor;

an input/output controller coupled to said processor and that asserts a low power signal to indicate that said computer system is operating in low power mode;

a low power mode indicator coupled to said input/output controller and that illuminates when said computer system is operating in low power mode; and a backlit button coupled to said input/output controller, said button controlling a function of said computer system, wherein said button includes a backlight that turns off when the low power signal is asserted.

21. The computer system of claim 20 further including a transistor coupled to said input/output controller and to said backlight and that provides current to illuminate said backlight, said transistor cutting off current to said backlight if said low power signal is asserted.

* * * * *